United States Patent [19]

Van Natta

[11] 4,207,952
[45] Jun. 17, 1980

[54] PLOW

[76] Inventor: Terry L. Van Natta, Davenport, Iowa

[21] Appl. No.: 922,028

[22] Filed: Jul. 5, 1978

[51] Int. Cl.² ............................................. A01B 3/00
[52] U.S. Cl. ................................................. 172/754
[58] Field of Search ............... 172/737, 747, 751, 754, 172/760, 704

[56] References Cited

U.S. PATENT DOCUMENTS

| 201,387 | 3/1878 | Carpenter | 172/754 |
|---|---|---|---|
| 273,316 | 3/1883 | Rollins | 172/754 |
| 1,018,397 | 2/1912 | Milliken | 172/760 |
| 1,648,532 | 11/1927 | Behrends | 172/737 |
| 2,306,996 | 12/1942 | Altgelt | 172/754 |
| 2,674,173 | 4/1954 | Wheeler | 172/704 |
| 2,908,339 | 10/1959 | Cook | 172/754 |

Primary Examiner—Richard T. Stouffer

[57] ABSTRACT

In a plow, a share having a thickened rearwardly extending mid-section with narrow upper and lower edge portions. The thicker mid-section provides increased share strength and resistance to breakage to improve expected share life. The upper edge portion of the share abuts the moldboard and is provided with a cross sectional thickness consistent with the cross sectional thickness of the moldboard to assure a continuously concave soil working surface over the share and onto the moldboard. The frog support is provided with a flat share supporting surface to reduce frog forming expense and a concave moldboard receiving surface to assure that the moldboard assumes the proper soil working surface when mounted.

10 Claims, 5 Drawing Figures

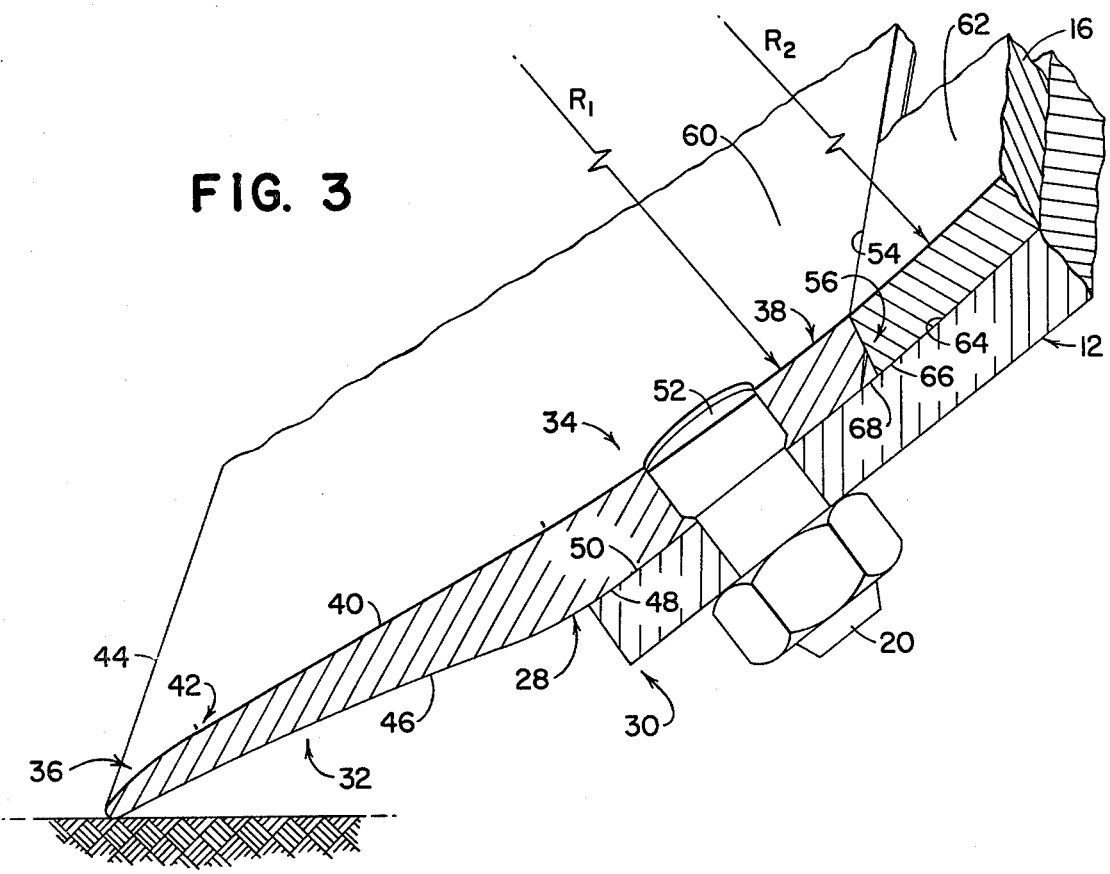
FIG. 3
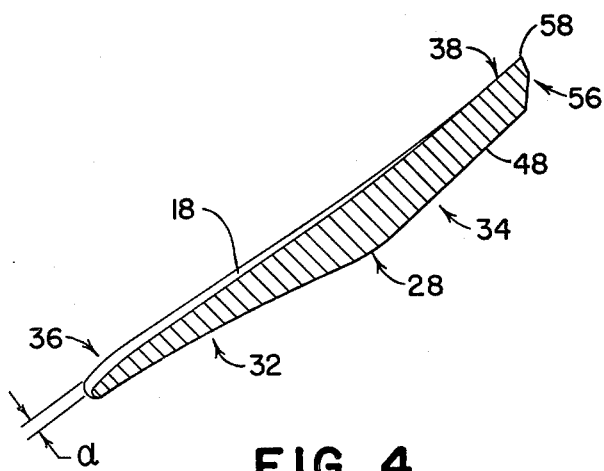
FIG. 4
FIG. 5

PLOW

BACKGROUND OF THE INVENTION

The present invention relates generally to earthworking agricultural implements and more particularly to moldboard plows.

As a plow bottom moves through the soil, the share or business end of the plow penetrates the soil and cuts the furrow slice loose. With continued use, the share eventually becomes worn and must be replaced. Not infrequently, however, the share will break or crack as obstacles in the soil are encountered. To reduce share breakage as obstacles are encountered, trip linkages have been provided which permit the plow to trip or raise and then pass over the obstacles. These linkages often include power reset mechanisms which reorient the plow for reentry into the ground after it has been tripped. Nevertheless, share failure occasionally occurs as a result of the forces which are encountered when the plow bottom is forced back into the ground by such mechanisms. To minimize the expense of replacing shares which fail, detachable share-cutting edges have been provided, see for example U.S. Pat. No. 2,038,340 to Briggs. Such edges, however, still require considerable time to install.

To extend the life of the share and reduce share breakage, the cross sectional thickness has been increased by some manufacturers. See for example the Model HS bottom as used on John Deere plows. When a share is thickened, the upper edge which abuts the moldboard is thicker than the lower edge of the moldboard. Consequently, the frog supporting it was reduced in thickness to drop the surface of the share to the same level as the moldboard or else shims were inserted between the moldboard and frog to raise the moldboard to the level of the share. Either solution was directed towards assuring that a continuously concave soil working surface existed across the moldboard-share joint. To offset the frog thickness beneath the share required additional forging expense and the assembly and replacement expense increased by shimming moldboards during manufacture or share replacement was significant. Further, when a moldboard was shimmed, portions of it were not supported. These portions are then subjected to severe stresses during soil working operation and often cause moldboard failure.

SUMMARY OF THE INVENTION

To overcome these problems, there is provided a new and improved share for use in a moldboard plow. To provide increased share strength and reduce share breakage during soil working operations, the share is composed of an elongated generally rectangular member which has a thickened rib area extending over and along the lower edge of the frog. Recent experience has indicated that the greatest stresses occur in this area during soil working operations.

The share is further provided with an upper wing section that becomes more narrow as it extends from the thickened rib area towards the joint with the moldboard. Adjacent the moldboard, the cross sectional thickness of the share matches that of the moldboard and thereby eliminates the need for shims beneath the moldboard.

To reduce the wear rate of the share, it is provided with a unique soil working surface over its width and along its length which controls the flow and pulverization of soil as it passes over the share and onto the moldboard. Between the rib area of the share and lower edge of the moldboard and extending along its length, the surface is essentially flat to control the acceleration of soil as it moves toward the moldboard. Between the rib area of the share and the lower edge of the moldboard and also along the length of the share, the surface is continuously concave with the concave soil working surface of the moldboard.

To provide a tight fit between the share and moldboard and therefore assure continuity between the concave soil working surfaces of the share and moldboard, the edge of the share is angled away from its top surface which abuts the vertical edge of the moldboard. Further, the lower edge of the share is spaced below the frog to reduce the wear rate of the frog and also provide for the share to penetrate the ground at the proper angle.

To reduce the manufacturing expense of the frog and assure a proper fit between the bottom of the share and the share receiving surface of the frog, both surfaces are essentially flat.

The share is further provided with a uniform and progressively increasing angular twist over its fore-and-aft length to effectively raise the rearwardly lower edge with respect to the front lower edge and change soil acceleration throughout the share length to match the concavity of the moldboard over its length.

BRIEF DESCRIPTION OF THE DRAWINGS

FIG. 3 is an enlarged and perspective partial view of the share as fitted to the frog and moldboard and taken along lines 3—3 of FIG. 2.

FIG. 4 is an enlarged cross sectional view of the share taken along lines 4—4 of FIG. 1 and illustrating the angular twist of the share over its length.

FIG. 5 is an enlarged and partial cross sectional view of the edge of the share which abuts the moldboard.

DESCRIPTION OF THE PREFERRED EMBODIMENTS

Figure 2:
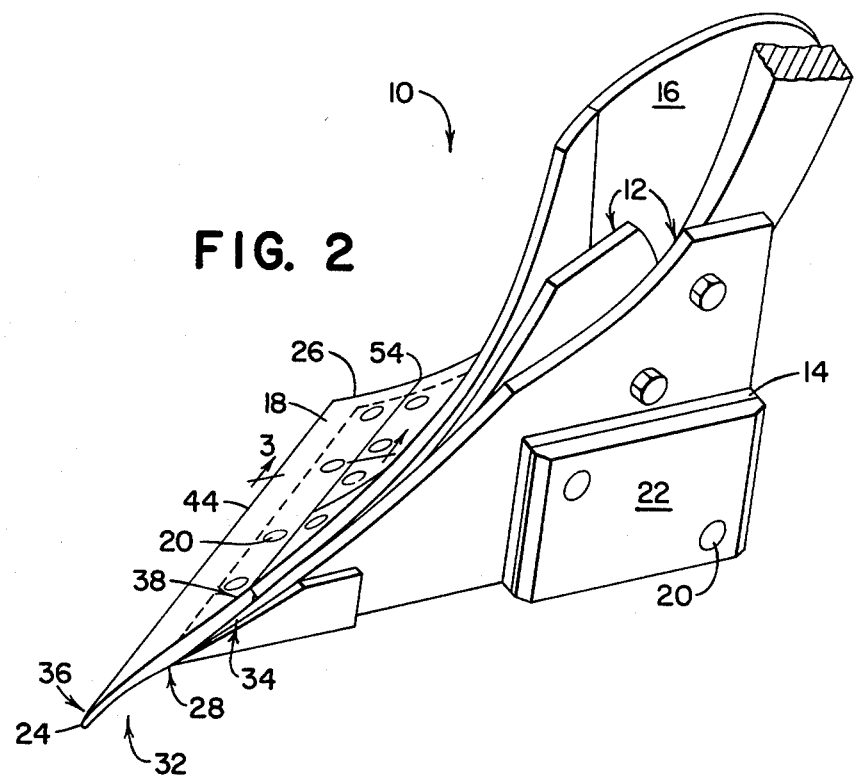
FIG. 2 is an enlarged front perspective of the plow illustrated in FIG. 1 and showing further detail of the plow parts.
Figure 1:
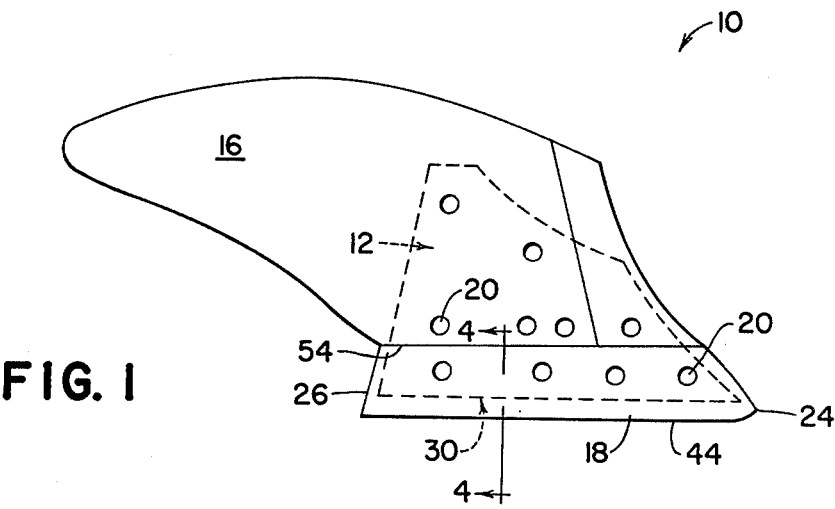
FIG. 1 is a side view of a plow incorporating the improved share.

A plow bottom 10 in which the present invention has been incorporated is illustrated in FIGS. 1 and 2. The plow 10 typically includes a supporting structure or frog 12, a landside 14, a moldboard 16 supported by the frog 12 and a share 18 carried on the lower portion of the frog 12. The landside 14 is secured by bolts 20 to the frog 12 and a reversible wear plate 22 is attached to the landside 14. Similar threaded studs 20 connect the share 18 and the reversible wear plates 22 to the frog or supporting structure 12.

The share 18, its shape and combination with the frog 12 and moldboard 16 comprise the principal portion of the present invention. As best illustrated in FIGS. 1, 2 and 3, the share 18 is secured to the frog 12 at an incline to the ground, is generally rectangular in shape and extends horizontally rearwardly from a forwardly soil penetrating point section 24 to a rear upstanding end 26. The share 18 includes a centrally located and rearwardly extending thickened rib area or mid-portion 28 substantially overlying the rearwardly extending and generally horizontal lower edge or shoulder 30 of the frog 12. As viewed in the cross sectional illustration of FIG. 3, the share 18 extends outwardly from the thickened rib area 28 in opposite directions to a lower wing section 32 and an upper wing section 34. Each wing section 32, 34 maintains substantially the same cross section illustrated in FIG. 3 along its fore-and-aft extending length. Each wing section 32, 34 also tapers from the thickened rib area 28 to narrow edge portions 36, 38.

The lower wing section 32 includes a substantially flat upper soil working surface 40 which extends between the thickened rib area 28, the lower edge of the wing section 32 terminating approximately at the area designated by the number 42. Carried at the tip of the lower edge portion 36 of the lower wing section 32 is a ground cutting tip or edge 44 which is curved slightly downwardly and extends below the frog 12 to penetrate the soil and minimize soil contact with and wear on the frog 12. Toward the same end, the lower surface 46 of the lower wing section 32 is concavely contoured to project the lower edge or tip 44 below the lower edge 30 of the frog 12.

The upper wing section 34 of the share 18 is seated on and attached to the rearwardly extending frog 12. The undersurface 48 of the share 18 seated on the frog 12 is substantially flat as is the share receiving surface 50 of the frog 12. Securing the share 18 to the frog 12 are the bolts 20 spaced along the length of the share 18 and having head surfaces 52 substantially flush with the top of the share 18. The rearwardly extending edge portion 38 of the upper wing section 34 includes the vertical surface 56 which is fitted tightly against the lower edge 54 of the moldboard 16 to provide a continuous soil working surface between the share 18 and moldboard 16. As best illustrated in FIG. 5, the vertical surface 56 is angled and includes a projecting and pointed edge 58 which forms an angle with the moldboard 16 to assure a well-fitting joint between it and the moldboard 16.

The soil working surface 60 of the upper wing section 34 extends generally between the thickened rib area 28 and the moldboard 16 and has a contour designed to be continuously concave with the concave contour of the soil working surface 62 of the lower portion of the moldboard 16 adjacent to and abutting the share 18.

In the preferred embodiment, the uninterrupted concave soil working surfaces 60, 62 extending from the rib area 28 of the share 18 and onto the moldboard 16 have a uniform radius R1, R2 of 370 millimeters. While another uniform radius or even differing radii could be adopted, the soil working surfaces 60, 62 need only be continuously concave so as to appropriately provide for the desired soil acceleration and pulverization across them. Additionally, soil working surfaces having a changing radius of curvature similar to the changing surface of the moldboard 16 as spaced from its lower edge would also be satisfactory. The moldboard surface contour in this preferred embodiment is formed with changing radii. That is, each point on the surface when not having the same radius as the point adjacent to it is then tangential to the circumference of the circle defined by the radius of the surface point which is adjacent to it.

To provide a continuously concave or no-step continuity between the soil working surfaces 60, 62 of the share 18 and the moldboard 16, the cross sectional thickness of both the edge 38 of the share 18 and the edge 54 of the moldboard 16 are substantially equal.

The upper surface of the frog 12, upon which the abutting edges 54, 56 are seated, is also contoured to assure that a continuingly concave soil working surface is provided between the joint formed by the share 18 and moldboard 16. The share receiving surface 50 of the frog 12 is flat as mentioned earlier. This flat surface 50 extends rearwardly along the lower edge 30 of the frog 12 and upwardly from the lower edge 30 terminating at the area where the upper edge 56 of the share rests. The surface 64 of the frog 12 beneath the moldboard 16 is contoured concavely consistent with the moldboard 16 to assure that the uniformly thick lower edge 54 of the moldboard 16 assumes the desired concave contour when secured to the frog 12. The concavely contoured surface of the frog 12 extends laterally upwardly from the juncture 68 with the flat surface 50 of the frog 12 and rearwardly from the forward end of the frog 12 to its rearward end. As illustrated in FIG. 1, threaded bolts 20 typically are utilized to secure the lower edge 56 of the moldboard 16 to the frog 12.

Looking now to FIG. 4, there is illustrated a cross sectional view of the share 18 taken along lines 4—4 of FIG. 1. As shown in this view, the share 18 is provided with a uniform angle of twist $\alpha$ over its length. The share 18 is twisted about a radius centered at its upper edge 56 and extending towards the tip 44 so as to elevate the lower soil engaging edge 44 over the length of the share 18. In the preferred embodiment, the share 18 is twisted 1° 12' plus or minus 30' over each 100 mm of length. Since the contour of the moldboard 16 changes from front to rear to assure soil pulverization and throw, the twist is provided to the share 18 to control soil acceleration over the soil working surface of the share 18 and to also assure that the proper speed is maintained as the soil approaches the concave soil working surface of the moldboard 16.

Assembly of the share 18, moldboard 16 and frog 12 are simplified with the improvement provided herein. The frog 12 is first loosely assembled to the moldboard 16 and then the share 18 is positioned as shown in FIGS. 2 and 3 with the flat undersurface 48 of the upper wing section 34 seated on the flat surface 50 of the frog 12. The thickened rib area 28 is positioned over the lower edge 30 of the frog 12 to provide additional strength to the share 18 at its terminating support point. The upper edge 56 of the share 18 is fitted against the lower edge 54 of the moldboard 16 with the pointed edge 58 forming a tight joint between the two parts. The bolts 20 in the moldboard 16 and share 18 are then tightened.

During plowing operations, the point section 44 of the share 18 will engage the soil first. As the cutting edge penetrates the soil, a furrow slice will be cut loose. As the share 18 and plow 10 are advanced through the soil, the sliced soil will be lifted up and flow across the flat lower wing section of the share 18. Since this surface 40 is flat, the soil will flow at a generally uniform rate. As the soil reaches the thickened rib area 28, the rate of flow will begin to increase due to the concavity of the surface of the upper wing section 34. Accordingly, the soil will begin to fracture or be sheared off in blocks as it is turned by the concave soil working surfaces 60, 62 respectively of the share 18 and moldboard 16. The thickened rib area 28 of the share 18 directly over the edge of the frog 12 will resist the stresses of soil working and failure and the elimination of shims beneath the moldboard 16 will reduce the stresses encountered by the moldboard 16 during soil working operations.

I claim:

1. In a plow comprising: structure having an elongated lower support shoulder; a moldboard fixed to the upper portion of the structure; said moldboard having a soil working surface with a lower share receiving edge spaced above the shoulder of the structure; a share having upper and lower edges and fixed to the structure and abutting along its upper edge the lower edge of the moldboard, said share having upper and lower surfaces diverging from each of its respective upper and lower edges to a thickened and elongated mid-portion overlying and supported by said shoulder; the upper surface of said share further being smooth and contoured to be continuously concave with the soil working surface of the moldboard adjacent its share receiving edge.

2. The invention defined in claim 1 wherein the concave soil working surface of the share extends along its length and from its edge adjacent the moldboard to the surface over its thickened mid-portion which is substantially over the shoulder of the structure.

3. The invention defined in claim 2 wherein the soil working surface of the share along its length and between its lower edge and the thickened mid-portion is substantially flat.

4. In a plow comprising: a frog including a rearwardly extending lower support shoulder; a moldboard fixed to the upper portion of the frog, said moldboard having a soil working surface with a lower share receiving edge extending along but spaced above the lower support shoulder of the frog; a rearwardly extending share having a soil working surface fixed to the lower portion of the frog, said share including upper and lower wing sections extending from a thickened mid-portion overlying and supported by the shoulder to narrower respective upper and lower edge portions, the upper wing section abutting at its edge portion the lower edge of the moldboard and the soil working upper surface of said upper wing section forming with the soil working surface of said moldboard adjacent its share receiving edge an uninterrupted concave surface.

5. The invention defined in claim 4 wherein the frog includes an upper surface portion formed to complement and receive the lower undersurface portion of the moldboard which is adjacent its share receiving edge, said surface portions being substantially parallel with the soil working surface of the moldboard which is adjacent its share receiving edge.

6. The invention defined in claim 4 wherein the lower edge portion of the share is angularly rotated upwardly from front to rear about a center line extending rearwardly along its upper edge portion and adjacent the lower edge of the moldboard.

7. In a plow comprising: a frog having a rearwardly extending lower support shoulder, a generally flat share receiving surface extending along and adjacent said shoulder and a concave moldboard-receiving surface adjoining and extending away from and along the share receiving surface; a moldboard having a soil working surface, the undersurface of the lower portion of said moldboard being convex, complementary with and fixed to the concave surface of said frog, said moldboard further having a lower share receiving edge extending rearwardly along and adjacent the flat surface of the frog; a rearwardly extending share having a soil working upper surface and a generally flat undersurface fixed to the flat share receiving surface of the frog, said share comprised of first and second wing sections extending outwardly from a thickened mid-portion to narrower edge portions, the mid-portion overlying and supported by the shoulder, said first wing section abutting at its edge portion the lower edge of said moldboard and the soil working surface of the moldboard adjacent its share receiving edge forming an uninterrupted concave soil working surface with the soil working surface of the first wing section.

8. In a plow bottom comprising: a frog having a rearwardly extending lower support shoulder, a substantially flat share receiving surface extending along and adjacent said shoulder and a concave moldboard receiving surface adjacent to and extending along said share receiving surface; a moldboard fixed to the concave surface of said frog, said moldboard having a lower share receiving edge extending rearwardly along the juncture between said flat and concave surfaces of said frog and a concave soil working upper surface adjacent said share receiving edge; and a rearwardly extending elongated share seated on and fixed to the flat surface of the frog, said share composed of a thickened mid-portion extending rearwardly along and generally overlying the shoulder of the frog and upper and lower wing sections extending from the sides of said mid-portion to narrow edges, the upper wing section abutting along its narrow edge the lower edge of the moldboard, the surface of said wing section forming an uninterrupted concave soil working surface with the surface of the moldboard which is adjacent said moldboard lower edge, and the lower wing section including a generally flat soil working surface adjoining said thickened mid-portion and extending rearwardly therealong.

9. In a moldboard plow the combination of a frog with an elongated generally horizontal lower edge and an upwardly facing upper surface composed of a flat portion extending lengthwise of said frog and beginning at said edge and extending upwardly to a juncture with a continuing upwardly facing concave portion also running lengthwise of the frog; a moldboard having a lower portion overlying the concave surface of the frog and having concave upper and lower sides with at least the lower side having the same contour as said concave surface of the frog, said moldboard having a lower longitudinally extending edge joining said upper and lower surfaces and positioned to extend upwardly from the upwardly facing surface of the frog generally at said juncture between the flat portion and concave portion; and a plow share having an upper edge abutting against and defining an abutting joint with said lower edge of the moldboard and a lower ground cutting edge offset downwardly and forwardly from the elongated lower edge of the frog, said plow share having an underside with a flat longitudinally extending surface portion engaging and bearing against said flat upper surface of said frog and extending from the abutting joint to said lower edge of said frog and having a continuing surface portion extending to said cutting edge, said plow share having an upper side that includes a concave portion opposite to the flat portion of the share that begins at said upper edge of the share and extends to an area above and opposite the lower edge of the frog and extends therefrom in a generally flat portion that terminates adjacent said cutting edge, the thickness of said plow share and said moldboard at said abutting joint being substantially equal so as to provide a generally smooth no-step continuity between the respective upper surface of said moldboard and said share at said joint, and said share expanding in thickness from said joint to said area opposite said lower edge of said frog and narrowing in thickness from said area to said cutting edge.

10. In a moldboard plow the combination of a frog with an elongated generally horizontal lower edge and an upwardly facing upper surface composed of a flat portion extending lengthwise of said frog and beginning at said edge and extending upwardly and rearwardly to a juncture, with a continuing upwardly facing concave portion also running lengthwise of the frog; a moldboard having a lower portion overlying the concave surface of the frog and having concave upper and lower sides with at least the lower side having the same concave as said concave surface of the frog, said moldboard having a lower longitudinally extending edge joining said upper and lower surfaces and positioned to extend upwardly from the upwardly facing surface of the frog generally at said juncture between the flat portion and concave portion; and a plow share having an upper edge abutting against and defining an abutting joint with said lower edge of the moldboard and a lower ground cutting edge offset downwardly and forwardly from the elongated lower edge of the frog, said plow share having an underside with a flat longitudinally extending surface portion engaging and bearing against said flat upper surface of said frog and extending from the abutting joint to said lower edge of said frog and having a continuing surface portion extending to said cutting edge, said plow share having an upper side that includes a concave portion opposite to the flat portion of the share that begins at said upper edge of the share and extends to an area above and opposite the lower edge of the frog and extends therefrom in a generally flat portion that terminates adjacent said cutting edge, the thickness of said plow share and said moldboard at said abutting joint being substantially equal so as to provide a generally smooth no-step continuity between the respective upper surface of said moldboard and said share at said joint, and said share expanding in thickness from said joint to said area opposite said lower edge of said frog and narrowing in thickness from said area to said cutting edge, said share further having opposite ends and a curvature between the ends characterized by progressively rising from said one end to the opposite end and with respect to a plane through the flat surface of said frog.

* * * * *

UNITED STATES PATENT AND TRADEMARK OFFICE
CERTIFICATE OF CORRECTION

PATENT NO. : 4,207,952
DATED : June 17, 1980
INVENTOR(S) : Terry L. Van Natta

It is certified that error appears in the above—identified patent and that said Letters Patent is hereby corrected as shown below:

On the title page the following should be added:

-- [73] Assignee: Deere & Company, Moline, Ill. --.

Signed and Sealed this

Fourth Day of November 1980

[SEAL]

Attest:

SIDNEY A. DIAMOND

Attesting Officer

Commissioner of Patents and Trademarks